Dec. 17, 1935. G. R. BARKER 2,024,621
GYROCOMPASS
Filed July 12, 1932 2 Sheets-Sheet 1

INVENTOR
George R. Barker.
BY
Robert A. Lavender
ATTORNEY

Patented Dec. 17, 1935

2,024,621

UNITED STATES PATENT OFFICE 2,024,621

GYROCOMPASS

George R. Barker, United States Navy

Application July 12, 1932, Serial No. 622,145

7 Claims. (Cl. 33—226)

(Filed but not issued under the act of March 3, 1883, as amended April 30, 1928; 370 O. G. 757)

This invention relates to a gyro-compass, and has for its object to provide a compass of the type described using electromagnetic means instead of ballistic to induce precession whereby latitude error and errors due to sudden changes of speed and/or course are eliminated.

With the above and other objects in view, the invention consists in the construction, combination and arrangement of parts as will be described more fully hereinafter.

In the drawings:

Fig. 3 is a side elevation of a gyro-compass embodying my invention.

A gyroscope has no inherent direction-seeking tendency and to make it applicable to use as the directive element in a compass there must be added thereto some device that is responsive to terrestrial phenomena. It is common practice to utilize means actuated by gravitational attraction to apply to the gyro a torque that will cause it to precess at such a rate and in such a sense as will keep the spin axis thereof directed toward the geographic pole. These gravitational ballistics, however, are affected by the rate of rotation of the earth and hence exercise varying effects in different latitudes, and are also influenced due to their inertia by changes in course or speed. My invention applies the precession-inducing torque by electromagnets and therefore eliminates the previous influences generated by the velocity and direction of movement of the ship and differences in the peripheral speed of rotation of the earth at different latitudes.

Any gyroscope with freedom of rotation about three axes will evidence fixity of its plane of spin, the axis thereof maintaining a definite relation to a point in space. Therefore, if a gyroscope having such freedom be operating (a point in north latitude being assumed for purpose of illustration) with its spinning axis parallel to the surface of the earth and pointing to the geographic pole, the north end of that axis will apparently precess to the east and upwardly. This apparent movement is due to the fixity of the plane of rotation of the gyro and to the rotation of the earth.

Figure 1:
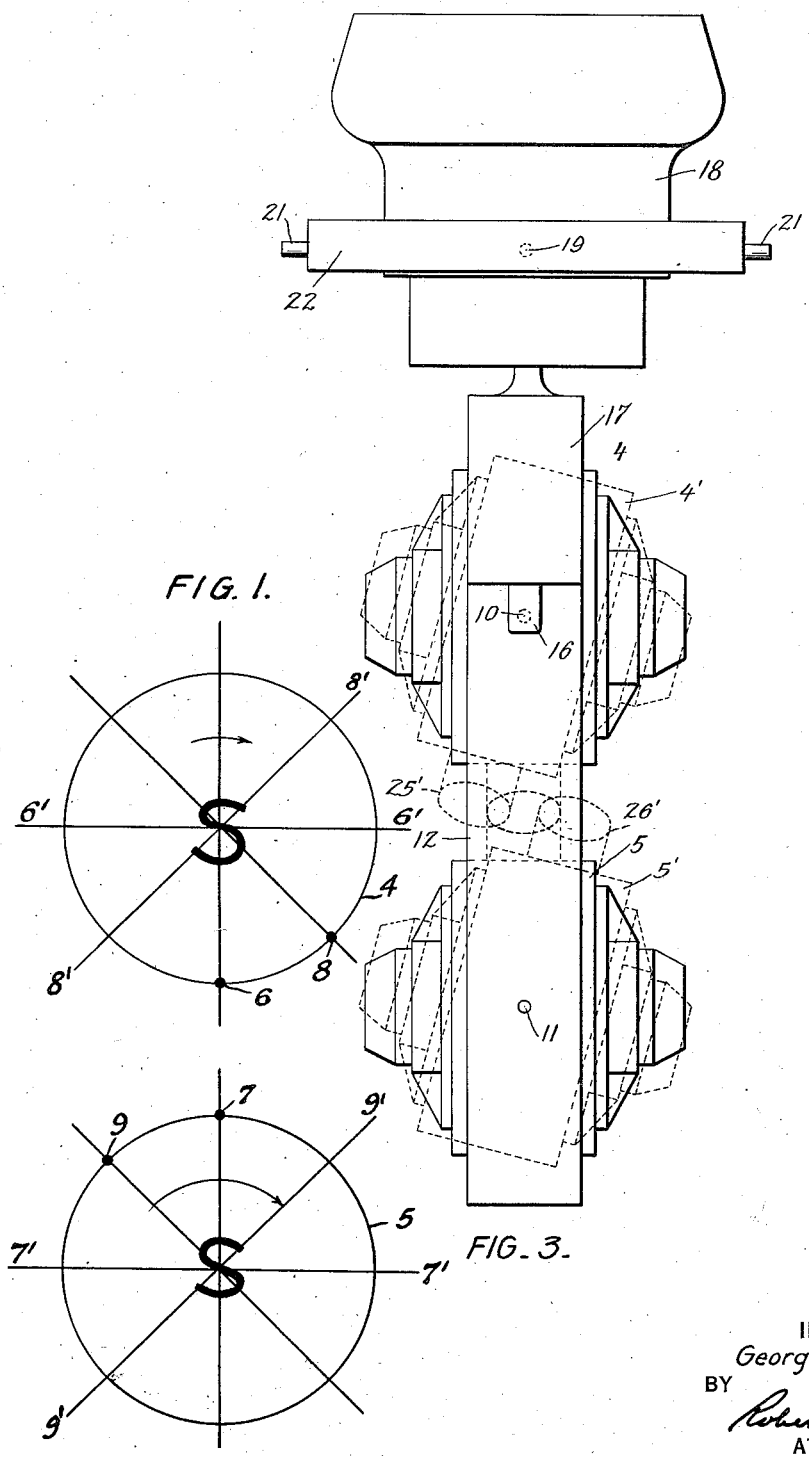
Fig. 1 is a diagrammatic representation of the gyros as used in my invention and the planes of application of the torques and of precession.
Figure 2:
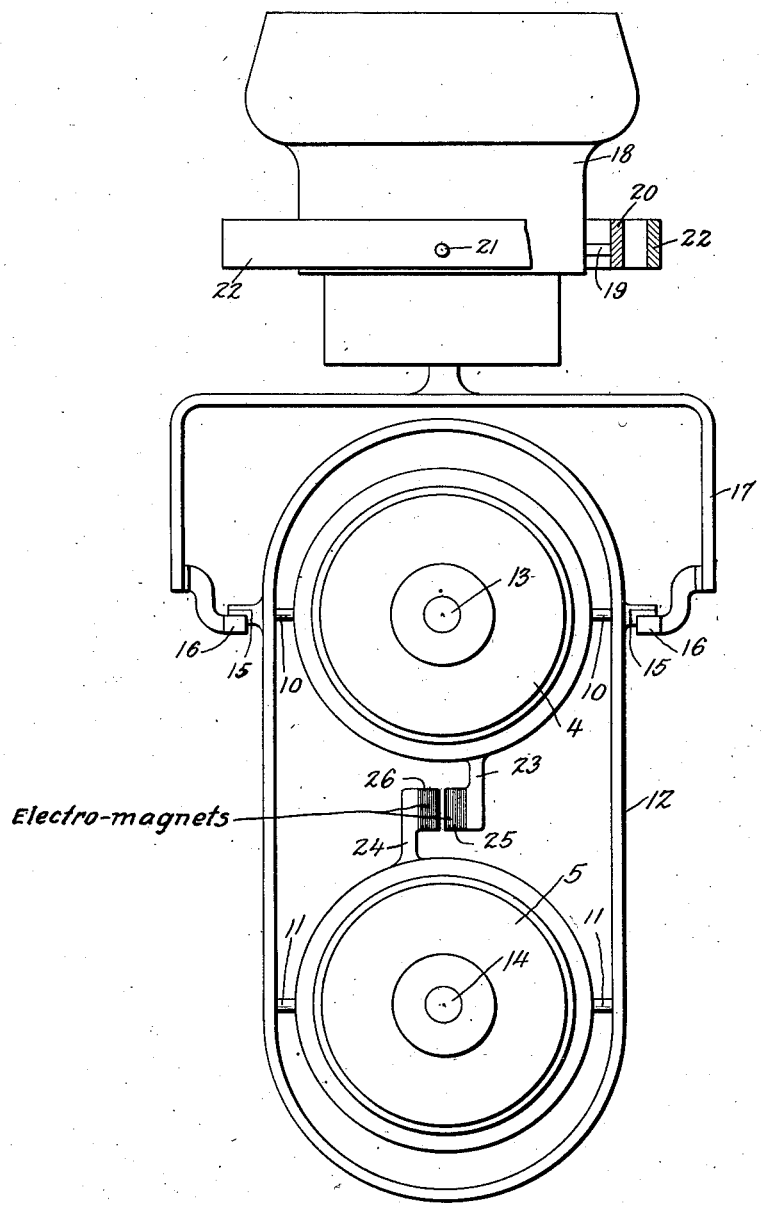
Fig. 2 is an elevational view thereof, looking at the south ends of the spin axes of the gyros.

In Fig. 1 it is assumed that the gyros 4 and 5 are rotating clockwise, that the spin axes extend north and south and that they are seen from the south. If a force acting from north to south be applied at 6 on the vertical axial line of gyro 4 the gyro will precess from east to west, the spin axis moving in the plane 6'—6'. A force acting from south to north at point 7 on gyro 5 would cause precession of that gyro from east to west in a counterclockwise direction looking down, the spin axis thereof moving in plane 7'—7'. If the conditions as above assumed existed and the forces applied were of the right magnitude the axes of spin of the gyros would continue to point to the north geographic pole.

An arrangement such as that described would not be practical in use as in general the direction of north would not be known, and it is necessary that the torques be so applied that the spin axes would be directed toward the geographic pole and the apparent tilt be overcome. This can be accomplished by exerting the forces at the points 8 and 9 on gyros 4 and 5, respectively, and the precessions would be such that the spin axes would move in planes 8'—8' and 9'—9', respectively.

My invention contemplates the use of two gyros 4 and 5 mounted in a suspension ring 12 on horizontal gudgeons 10 and 11 at right angles to the spin axes 13 and 14. Ring 12 is carried by knife edges 15 fixed to ring 12 and adapted to rock in V blocks 16 on suspension frame 17, that is suspended in any suitable way from spider 18 which has diametrically opposite gudgeons 19 journalled in inner gimbal ring 20 which in turn is mounted on gudgeons 21 journalled in outer gimbal ring 22 at right angles to gudgeons 19. The vertical axis of ring 12, which is the line midway between the sides of the ring and parallel thereto, is normally aligned with the axis of suspension of frame 17. It is to be understood that the suspension of frame 17 from spider 18 is such that the frame 17 is free to rotate about a vertical axis with a minimum of friction. The compass card (not shown) is fixed to rotate with the suspension frame 17.

Brackets 23 and 24 are fixed to gyros 4 and 5 off the vertical axial lines of the gyros and carry electromagnets 25 and 26 respectively that are axially aligned when the gyros are not tilted in ring 12, and which tend to draw the gyros back into the untilted position when they are displaced therefrom. The positions of brackets 23 and 24 with respect to the vertical axial lines of the gyros are to apply to the gyros torques having the same general relation and effect as those acting at points 8 and 9 in Fig. 1. The term "vertical axial line" refers to a line through the spin axis of the gyro at right angles to the gudgeons that support the gyro case.

The dotted line positions 4' and 5' of the gyros 4 and 5 show the orientation the gyros would assume with respect to the suspension ring 12 if there were no mechanism to prevent their relative movement with respect to the suspension ring as the ship travels from place to place. It will be noted that the magnets 25' and 26' are spaced a considerable distance apart, although the spin axes of the gyros are still parallel, due to the fact that one of the magnets is on the upper side of the gyro case on which it is mounted and the other magnet is on the lower side of the other gyro case, and also that these cases have rotated on their horizontal axes with respect to the ring 12.

If the magnets 25' and 26' be energized to attract each other, torques will be applied to the gyro cases at points corresponding to the points 8 and 9 in Fig. 1, which will cause the gyros to precess about axes lying at an angle to the vertical axes of the gyros and hence will cause precession of the spin axes to the west and also toward the horizontal. When the magnets 25 and 26 are again axially aligned the spin axes of the gyros will point to the geographic pole and will be parallel to the earth's surface. It is apparent that if the magnets 25 and 26 be energized at all times while the ship is moving, the attraction of the magnets will keep them axially aligned and the tendency of the suspension ring 12 to turn with respect to the fixed plane of the gyros will apply to the gyros exactly the torque to cause them to precess and hold their spin axes directed toward the geographic pole.

There are no mechanically contacting parts involved in the means for keeping the gyros in the same relative position in the suspension ring and therefore there are no frictional forces applied to the gyros thereby. The forces involved in holding the gyros in the same relative positions in the suspension ring do not depend upon the effect of gravitation and are therefore independent of changes in course, speed, or latitude and consequently my invention is free from errors due to any of the enumerated factors, it being understood that any well known damping means may be employed to prevent pendulous oscillation of frame 17 when the course or speed is changed.

If desired the gyros may be statically balanced by the addition of suitable weights at the proper positions on the gyro cases to neutralize the effect of the masses of the brackets 23, 24 and magnets 25, 26.

It will be understood that the above description and accompanying drawings comprehend only the general and preferred embodiment of my invention, and that various changes in construction, proportion and arrangement of parts may be made within the scope of the appended claims without sacrificing any of the advantages of my invention.

The invention described herein may be manufactured and used by or for the Government of the United States of America for governmental purposes without the payment to me of any royalties thereon.

I claim:

1. In a gyroscope compass, a suspension frame mounted for universal movement, V blocks carried by said frame, a suspension ring, knife edges carried by said ring above the center of gravity thereof and disposed in said V blocks, two clockwise rotatable gyroscopes mounted on horizontal gudgeons in said ring, a bracket on the side of each gyroscope case adjacent the other to extend toward the other case, said brackets being disposed on opposite sides of the common vertical axial line of said gyroscopes, and an electromagnet carried by each of said brackets, said magnets being adapted to lie adjacent and in axial alignment with each other whereby they may mutually interact.

2. In a gyroscope compass, a suspension frame mounted for universal movement, a suspension ring carried thereby on horizontal supporting members disposed above the center of gravity of said ring, two gyroscopes mounted on horizontal gudgeons in said ring, a bracket on the side of each gyroscope case adjacent the other to extend toward the other case, said brackets being disposed on opposite sides of the common vertical axial line of said gyroscopes, and an electromagnet carried by each of said brackets, said magnets being adapted to lie adjacent and in axial alignment with each other whereby they may mutually interact.

3. In a gyroscope compass, a suspension frame mounted for universal movement, a suspension ring pendulously carried thereby pivotal about a normally horizontal axis, two gyroscopes pivotally mounted one above the other on horizontal gudgeons in said ring, and electromagnetic means carried by the cases of said gyroscopes in positions mutually to interact to hold the vertical axial lines of said gyroscopes in alignment with the vertical axis of said ring.

4. In a gyroscope compass, a suspension frame mounted for universal movement, a suspension ring carried thereby, two gyroscopes rotating in the same direction mounted on horizontal gudgeons in said ring, and mutually interacting electromagnets operatively acting on said gyroscopes to hold the vertical axial lines thereof aligned with the vertical axial line of said ring.

5. In a gyroscope compass, a suspension frame mounted for universal movement, a suspension ring carried thereby, two gyroscopes mounted for pivotal movement about horizontal gudgeons in said ring, and cooperating mutually attracting electromagnetic devices carried by said gyroscopes so mounted as to be moved in opposite directions from the common plane of said gudgeons upon divergence of the vertical axial lines of said gyroscopes in the same direction of rotation from alignment with the vertical axial line of said ring.

6. In a gyroscope compass, a suspension frame mounted for universal movement, a suspension ring carried thereby, two gyroscopes mounted for movement about horizontal gudgeons in said ring, and mutually attracting electromagnetic means mounted on adjacent sides of said gyroscopes respectively and on opposite sides of a plane through the spin axes of both gyroscopes.

7. In a gyroscope compass, suspension means mounted for universal movement, gyroscopes carried by said means, and mutually attracting electromagnetic means carried by said gyroscopes respectively to prevent displacement of the normally vertical axial lines of said gyroscopes with respect to the vertical axis of said suspension means.

GEORGE R. BARKER.